United States Patent [19]

Fisher

[11] Patent Number: 5,022,935
[45] Date of Patent: Jun. 11, 1991

[54] DEOXIDATION OF A REFRACTORY METAL

[75] Inventor: Richard L. Fisher, Warren, Ohio

[73] Assignee: RMI Titanium Company, Niles, Ohio

[21] Appl. No.: 483,234

[22] Filed: Feb. 22, 1990

Related U.S. Application Data

[63] Continuation-in-part of Ser. No. 248,227, Sep. 23, 1988, Pat. No. 4,923,531.

[51] Int. Cl.$^5$ .................................................. C21D 1/00
[52] U.S. Cl. .................................... 148/126.1; 148/27; 148/132; 148/133; 75/614
[58] Field of Search ..................... 148/126.1, 132, 133, 148/27; 75/614

[56] References Cited

U.S. PATENT DOCUMENTS

| | | | |
|---|---|---|---|
| 2,537,068 | 1/1951 | Lilliendahl et al. | 75/84 |
| 2,653,869 | 9/1953 | Gregory et al. | 75/84 |
| 2,834,667 | 5/1958 | Rostron | 75/0.5 |
| 4,126,493 | 11/1978 | Wurm | 148/20 |
| 4,519,837 | 5/1985 | Down | 75/0.5 B |
| 4,923,531 | 5/1990 | Fisher | 148/20 |

Primary Examiner—Stephen J. Lechert, Jr.
Attorney, Agent, or Firm—Scully, Scott, Murphy & Presser

[57] ABSTRACT

A process for the deoxidation of a refractory metal containing minor concentrations of oxygen is disclosed. In this process the refractory metal is contacted with a metallic deoxidant in a dry, inert atmosphere. The metallic deoxidant and the refractory metal are heated to at least liquefy the metallic deoxidant and at least partially deoxidize the refractory metal. The refractory metal is thereafter cooled and contaminants on its surface are removed.

46 Claims, No Drawings

DEOXIDATION OF A REFRACTORY METAL

REFERENCE TO RELATED APPLICATION

This is a continuation-in-part of U.S. patent application, Ser. No. 248,227 filed Sept. 23, 1988, U.S. Pat. No. 4,923,531.

BACKGROUND OF THE DISCLOSURE

1. Field of the Invention

The present invention is directed to a process for removing oxygen from a refractory metal. More particularly, the present invention describes a process for removing oxygen from a refractory metal by treatment with a metallic deoxidant.

2. Background of the Prior Art

It should be understood that the invention concerns a process for the deoxidation of refractory metal and metal alloys which contain only minor amounts of oxygen, as contrasted with processes for the reduction of ores to produce metal. Processes to reduce ores or metal oxides to metal usually require extreme temperatures, as shown in several disclosures. For example, U.S. Pat. No. 2,834,667 to Rostron teaches direct thermal reduction of titanium dioxide by using metallic magnesium at a temperature not substantially less than 1000° C. U.S. Pat. No. 2,537,068 to Lilliendahl et al. shows the reduction of zirconium oxide or double chloride with calcium at temperatures between 1100° C and 1200° C. U.S. Pat. No. 2,653,869 to Gregory et al. which discusses the manufacture of vanadium powder from vanadium trioxide mixed with calcium and calcium chloride at a temperature between 900° C. and 1350° C. U.S. Pat. No. 4,519,837 to Downs describes a method of reducing metal oxide powders at 600° C. using molten lithium and magnesium or molten lithium and calcium metals.

A pure metal or alloy can become contaminated with oxygen by the various cutting, machining, rolling, forging and heating processes used to shape and work the metal. Although processes are known which remove surface oxide scale from metal e.g., washing with detergents, acid pickling, shot blasting and grinding, no practical commercial method has yet been developed to remove oxygen which has diffused into the lattice structure of the metal itself.

The use of calcium to reduce refractory metal oxides, in distinction to the removal of minor concentrations of oxygen, is well known. However, the use of calcium to deoxidize superficially oxidized metal, i.e. minor concentrations of oxygen, has been less successful. Prior art methods require high temperatures and an excess of pure, expensive calcium for this purpose. Generally these methods use multiple reductions or treatments to completely remove oxygen from the final metal. As suggested in the Rostrom 667 patent, calcium could be dispersed in a fused calcium chloride bath, maintained at about 1000° C. or higher, and used to deoxidize titanium scrap metal. However, large excesses of calcium and calcium chloride are required.

BRIEF SUMMARY OF THE INVENTION

A new process has now been developed which permits the deoxidation of minor concentrations of oxygen included in refractory metals. This process occurs at relatively lower temperature and is accomplished by lower concentrations of deoxidant than is used in the prior art.

In accordance with the present invention a process is provided wherein a refractory metal containing small concentrations of oxygen is contacted with a metal deoxidant in a dry, inert atmosphere. The contacted refractory metal and the metallic deoxidant are heated to a temperature sufficient to at least liquidify the metal deoxidant and at least partially deoxidize the refractory metal. The heated deoxidized refractory metal and metallic deoxidant are then cooled. Contaminants on the surface of the deoxidized refractory metal are thereafter removed.

DETAILED DESCRIPTION

The refractory metals within the contemplation of the present invention are sometimes called "reactive" metals because they are highly reactive with oxygen, typically have high melting points and require substantial energy to reduce their ores.

Refractory metals suitable for treatment by the inventive process include titanium, zirconium, hafnium, thorium, vanadium, niobium, tantalum, chromium, molybdenum, tungsten, alloys thereof, and mixtures thereof. Preferred refractory metals are the Group IVA metals titanium, zirconium and hafnium and the Group VA metals vanadium, tananium and niobium. Of these, titanium, niobium, zirconium and vanadium are more preferred, with titanium and zirconium being even more preferred. Because of its commercial significance, titanium is most preferred. As suggested above, the term refractory metal should be read to include mixtures of one or more metals, mixtures of one or more alloys containing the recited metals and mixtures of one or more metals with one or more alloys.

The process is directed to the deoxidation of metals which contain oxygen in relatively small amounts as surface or interstitial impurities. Preferably, the refractory metal contains up to about one weight percent oxygen, more preferably, less than about 0.5 percent. As stated above, the process is effective for alloys of refractory metals, although it should be noted that alloys containing oxygen-scavenging elements such as yttrium, erbium, or rare earths cannot be effectively deoxidized.

The refractory metal can be processed in the process of the present invention in the form of sheet, foil, turnings, chips, chunks, powders and the like. In general, it is preferred that the refractory metal be provided in a thickness of less than about 0.1875 inch. More preferably, the thickness of the refractory metal is no more than about 0.125 inch.

If scrap metal is used it should be cleaned, as necessary, with detergents, organic solvents or by mechanical means, such as centrifugation, to remove oil and grease. Undesired metal contaminants such as drill bits can be physically or magnetically removed. The material should also be dried, if necessary, to remove moisture.

The process is particularly desirable for use on metal powders because powders retain their size and surface characteristics following deoxidation. Pure or alloyed metal powder, plasma rotating electrode powder (PREP), rapidly solidified powder (RSP), sponge fines, hydride-dehydride powder and gas atomized powder can be treated with the inventive process.

The process involves contacting the oxidized refractory metal with a metallic deoxidant. The metallic deoxidant is a metal that readily forms oxide at the temperature of this process but does not form alloys with the refractory metal. Refractory metals meeting these criteria include calcium, barium and strontium. These metals are preferred for use as the refractory metal. Of these, calcium is particularly preferred because it is readily and economically available compared to barium and strontium. It, furthermore, is characterized by a melting and a boiling temperature particularly attractive to the desired thermodynamic conditions of the present process.

Although it is emphasized that any concentration of metallic deoxidant is operable, it is preferred to introduce the metallic deoxidant in a concentration which although providing a large molar excess compared to the concentration of oxygen in the refractory metal, is not present in too great an excess so as to present refractory metal-metallic deoxidant separation problems. To this end, it is preferred that the metallic deoxidant be present in an amount such that it represents between about 1% and about 3% by weight, based on the weight of the refractory metal.

The metallic deoxidant, preferably calcium, barium or strontium, and most preferably, calcium, may be used in the process of this invention as the pure metal. In the preferred embodiment wherein the metallic deoxidant is a pure metal, it may be provided as shot, turnings, chunks, ingot or liquid. Of these forms, calcium shot, a form of pure calcium metal known as those skilled in the art, is particularly preferred.

In another preferred embodiment the metallic deoxidant is provided in as a metallic mixture. In this embodiment the metallic deoxidant is mixed with a carrier metal. The carrier can be any metal that does not form alloys with the oxidized metal and is removable from the system by distillation, leaching or other means. The carrier must also have a lower melting point than the metallic deoxidant. Preferably, the boiling point of the carrier is above the melting point but below the boiling point of the deoxidant. These thermodynamic conditions allow good dispersion of the molten deoxidant over the refractory metal and also permits selective removal of the carrier by distillation.

Alkali metals, alkaline earth metals, and zinc are preferred for use as the carrier metal. Within these generic classes lithium, potassium, sodium, magnesium and zinc are preferred. Of these, sodium and magnesium are more preferred, with sodium being particularly preferred.

The metallic deoxidant and the metal carrier can be combined and then heated or the deoxidant can be added to the molten carrier. In a preferred embodiment, existing mixtures of calcium and sodium produced as a by-product of sodium metal manufacturing are conveniently used. These mixtures, known as "sodium sludges," are the metallic residues produced during the electrolysis of sodium and calcium fused salts followed by filtration of the liquid sodium metal. Such sludges may contain from 65 to 95 percent sodium, 5 to 35 percent calcium, and varying quantities of oxides or chloride salts of either sodium or calcium. The sludge melts between about 110° C. and about 200° C. depending upon their particular composition.

If natural sodium sludge is not available a mixture of calcium and sodium may be used, with calcium representing about 1 to about 35 weight percent, preferably about 1 to about 10 weight percent, based on the total weight of the mixture.

In a third preferred embodiment, the metallic deoxidant may be a mixture of pure metal, in one of the forms mentioned above, and a mixture of a metallic deoxidant with a carrier metal. For example, the metallic deoxidant may, in the preferred embodiment wherein calcium is employed, be a blend of calcium shot with sodium sludge.

The refractory metal containing oxygen is preferably placed in a dry crucible made of inert metal that does not react or alloy with the refractory metal, for example titanium, titanium alloy, Hastelloy metal, stainless steel or steel, and then mixed with the metallic deoxidant. To avoid moisture or other sources or oxygen contamination, the mixing can be conducted in dry air, for example, air maintained at a dew point of minus 10° C., or more preferably, in an atmosphere of an inert gas.

The crucible is placed in a dry retort which is sealed, evacuated and pressurized with any inert gas that does not react with any of the metals at the process temperature. Nitrogen should not be used with certain metals such as titanium because it embrittles the metal. Argon is preferred. The retort can be connected to a condenser system suitable for the collection and the condensation of vapor of the carrier metal if a mixture is utilized. Thermocouples and pressure measuring equipment can optionally be connected to the system. If desired, the furnace retort can itself be used as a crucible to contain the refractory metal and the metallic deoxidant.

The method of contact of the refractory metal with the metallic deoxidant depends, of course, upon the embodiment employed to contact the components. That is, it depends upon which preferred form of refractory metal and metallic deoxidant contact each other. For instance, if the refractory metal is in sheet form jigs, fabricated from suitable materials, can be used to support the sheet in the retort or other heating means. If foil is used, it can be suspended from hangers in the retort. If the refractory metal is in the form of sheets or foil and if the metallic deoxidant is present as a pure metal, the pure metal deoxidant can be disposed beneath the suspended sheet or foil in inert metal boats. When forms of refractory metal scrap are utilized, they can be mixed with either preferred form of the metallic deoxidant, the pure metal, a metal mixture or a mixture of the pure metal and the metal mixture, by charging alternate layers of refractory metal and metallic deoxidant to the heating means, usually a retort.

The retort or other heating means is heated to the reaction temperature, which can be in the range of between about 700° C. and about 1200° C., and held for a period of about one to about twelve hours. The retort can be maintained at any convenient pressure from substantially full vacuum to about 20 pounds per square inch gauge (psig). In a preferred mode of operation, the retort is held at a temperature of about 800° C. to about 1000° C. under a pressure of about 2 to about 10 psig for about 2 to about 12 hours. More preferably, the contact occurs at a temperature of between about 900° C. and about 1000° C. and a pressure of between atmospheric pressure and about 10 psig. Still more preferably, the pressure is in the range of between about 0.25 psig and about 2 psig.

In regard to the pressure in the retort, although a vacuum has advantages, it is critical to prevent oxygen from entering the system. Thus, operation at a positive pressure is preferred. If atmospheric pressure is utilized continuous flow of an acceptable inert gas is preferred.

At the end of the heating period, the retort is cooled under an inert gas atmosphere to approximately ambient temperature. The retort is isolated from the condenser, opened to the atmosphere, and unloaded. The treated metal, especially if originally powdered, is often sintered into a large mass. This mass can be crushed, if desired, to regain its original size distribution and shape characteristics. Standard crushing and materials handling equipment can be used to resize the metal. Roll or jaw crushers may be used, preferably under an inert gas blanket, to avoid reoxidation of the metal.

The deoxidized refractory metal is then leached with a dilute mineral or organic acid to remove residual metallic deoxidant, if present, metal carrier, oxides of the deoxidant and soluble metal compounds from the surface of the treated refractory metal. Any suitable mineral or organic acid may be used to remove these contaminants, provided no insoluble precipitates are formed by reaction with the metallic deoxidant. In a preferred embodiment of the process, about one-half (0.5) to about three (3%) percent muriatic (hydrochloric) acid is used to remove the oxide surface layers and any free deoxidant metal from the treated metal. Other preferred acids that may be used include acetic acid and nitric acids. Sulfuric acid, it is noted, is not recommended for use in this application. Metal or organic salts may be also added to the leach solution to minimize hydrogen pickup during the leaching step. Any suitable leaching equipment can be used to accomplish this stage of the process. Batch stirred tanks, flow-through static bed equipment and rotary leaching equipment are all suitable for use in this step of the process.

The leached refractory metal is preferably next washed with water until all acid is removed. The metal is next dried in either a batch or continuous dryer. It is preferable to use vacuum drying equipment to complete this stage of the process.

The dry, treated metal is sampled and analyzed for oxygen using conventional methodology. It has been found that the process of this invention reduces the oxygen level to between about 10% to about 90%, usually about 20% to about 80% of the original oxygen content.

The following examples are given to illustrate the scope of the present invention. Because these examples are provided for illustrative purposes only, the invention should not be limited thereto.

EXAMPLE 1

Treatment of Titanium Scrap Metal Using a Mixture of Calcium and Sodium

Pure titanium scrap turnings were washed with acetone to remove surface oil and dirt. The cleaned titanium turnings, weighing 55 grams, were mixed with 10 grams of sodium sludge cut into one-eighth inch cubes and placed into a 150 milliliter titanium beaker. The sodium sludge was obtained from a commercial sodium metal production plant and contained approximately 23% calcium. All mixing and sludge handling was done in a dry box under a dry, argon atmosphere.

The beaker was sealed with a loose fitting lid and placed into a Hastelloy metal retort. The retort was sealed and placed in a crucible furnace. The retort was evacuated and flushed with high purity argon three times prior to heating. When the temperature in the retort reached 500° C., the argon vent was closed. The temperature was raised to 840° C. and held for two hours. The retort temperature was then raised to 940° C. and held for another two hours. Pressure in the retort was maintained at 10 psig during the heating cycle.

The retort was then cooled to room temperature and opened. The titanium turnings were removed from the retort and crushed. The treated turnings were leached in three volumes of 0.5% hydrochloric acid solution in a Pyrex beaker with vigorous stirring, then washed three times with deionized water. The acid-free scrap was placed in a vacuum drying oven and dried overnight at a temperature of 110° C. and a vacuum of 23 inches Hg. The turnings were melted into a button and analyzed for oxygen. The oxygen content of the scrap was found to have been decreased from an initial value of 0.197% to a final concentration of 0.052%, a reduction of 79%.

EXAMPLE 2

Treatment of a 6-4 Titanium Alloy With a Mixture of Calcium and Sodium

Turnings from a 6-4 titanium alloy, a titanium alloy containing 6% aluminum and 4% vanadium, were mixed with 10 grams of sludge in a weight ratio of 5.5 to 1. The sludge contained 23% calcium. The mixture was stirred and heated in the same manner as described in Example 1. The retention times at 840° C. and 940° C. were increased to three hours each. Analysis of the purified turnings indicated that the oxygen level had decreased from a starting value of 0.255% to a final value of 0.031%, a decrease of 88 percent.

EXAMPLE 3

Treatment of 6-4 Titanium Alloy With Calcium Metal and a Mixture of Calcium and Sodium A 55 gram sample of the 6% aluminum, 4% vanadium (6-4) titanium alloy turnings used in Example 2 was heated with 10 grams of a sodium sludge containing 20 to 23% calcium. One (1) gram of pure calcium shot was added to this mixture. The reaction retort was heated to 840° C. and then 940° C. for two hours at each temperature as described in Example 1. The final oxygen level of the treated turnings was found to be 0.027%, a decrease of 89%.

EXAMPLE 4

Treatment of 6224 Titanium Alloy With a Mixture of Calcium and Sodium

A 60 gram sample of 6224 titanium alloy, a titanium alloy containing 6% aluminum, 2% molybdenum, 2% tin and 4% zirconium, was treated with 5 grams of sodium sludge similar to that used in Examples 1 to 3. The internal temperature of the retort was maintained at 830° C. and then 950° C. for one hour at each temperature under a pressure of 2 psig and 10 psig respectively. The temperature was maintained at 950° C. for one additional hour with a small argon flow through the system at a retort pressure of 2 psig. The analysis of the treated sample showed that an original oxygen content of 0.325% had been lowered to 0.023%, a decrease of 93%.

EXAMPLE 5

Treatment of a Titanium Alloy With a Mixture of Calcium and Sodium

A 69 gram sample of a titanium alloy powder passing through a 30 mesh screen, an alloy containing 6% aluminum, 6% vanadium, and 2% tin, produced by the plasma rotating electrode process (PREP) was mixed with 2.5 grams of sodium sludge containing 20 to 25% calcium in a dry box in which an argon atmosphere was maintained. The sludge was precut into ⅛ inch cubes and blended with the powder in a 150 ml. titanium beaker. The beaker was covered with a loose fitting lid and transferred to a high temperature alloy furnace retort. The retort was evacuated and refilled with high purity argon three times prior to heating.

The temperature of the retort was increased gradually to 500° C. and the argon vent was closed. The temperature was again increased to a temperature of 845° C. and was held constant for one hour at a retort pressure of 10 psig. The temperature was then raised to 880° C. and was maintained for two hours at a retort pressure of 2 psig. During the last hour of heating, argon gas was allowed to vent from the retort at a nominal rate.

The furnace was turned off and the retort was cooled to room temperature. The retort was opened and the reaction products were removed from the titanium beaker. The mass was crushed using a laboratory mortar and pestle to a size which would pass through a 40 mesh screen. The crushed powder was leached with three volumes of dilute (0.5%) hydrochloric acid and washed with three volumes of deionized water. Acid leaching and washing was conducted with vigorous stirring. The wet powder was dried in a vacuum oven at 110° C. and a vacuum of 23 inches Hg until thoroughly dry.

The treated powder was sampled and analyzed for residual oxygen content. Analysis showed that the residual oxygen content of the powder had been decreased 68% from a starting value of 0.174% to 0.055% as a result of the deoxidation treatment.

EXAMPLE 6

Treatment of a Mixture of Titanium Metal and Titanium Aluminide Powder With a Mixture of Calcium and Sodium A 100 gram sample of titanium alpha 2 aluminide powder passing through a 30 mesh but not an 80 mesh screen was mixed with 10 grams of sodium sludge. The sludge, containing between 20 and 25% calcium, was melted at 150° C. prior to being mixed with the aluminide powder in a dry box containing a pure argon atmosphere.

Thirty grams of chemically pure titanium metal granules about one-eighth cubic inch in size were added to the mixture of sludge and powder. An additional 15 grams of the same titanium granules were spread evenly over the bottom of a 150 ml. titanium beaker prior to addition of the powder, sludge and pure titanium granules mixture. The titanium granules were added to make the resultant powder mass more porous and easier to remove from the titanium beaker as well as making the products easier to crush.

The beaker was sealed with a loose fitting lid and transferred into an alloy retort in an electrically heated crucible furnace. The retort was sealed, then evacuated and refilled with pure argon three times. The retort was then heated to a temperature of 500° C. at which time the argon vent was closed. The temperature was gradually increased to 830° C. and held constant for one hour at a retort pressure of 2 psig. The retort temperature was then raised to 930° C. and the pressure was allowed to rise to 10 psig. These conditions were held for one hour. The pressure of the retort was then lowered to 2 psig and held for another two hours at 930° C. Argon was allowed to vent from the retort at a low rate during this period.

After four hours, the furnace and retort were allowed to cool to room temperature. The retort was then opened and the contents of the titanium beaker were removed and crushed to pass though a 40 mesh screen. During the crushing operation, the larger, pure titanium granules were sieved from the powder. The crushed powder was then thoroughly leached in a 0.5% solution of muriatic acid following the same procedures detailed in Example 1. The leached powder was vacuum dried overnight at a pressure of 23 inches Hg.

Analysis of the dried power showed that the residual oxygen content had been reduced 76% from a starting value of 0.1754% to a final level of 0.0412%.

EXAMPLE 7

Treatment of Niobium Hydride Powder With a Mixture of Calcium and Sodium

A 113 g. sample of niobium hydride-dehydride metal powder passing through a 140 mesh but not a 325 mesh screen containing 0.069% oxygen was treated in a manner similar to Example 5. About 9.4 g. sodium sludge (containing about 30% calcium) was used, with heating at 845° C. for one hour at 3 psig, then at 950° for four hours at the same pressure. The sample was cooled, then crushed and leached with 2% hydrochloric acid. Residual oxygen was determined to be 0.032%, a decrease of 53% from the oxygen concentration originally present.

EXAMPLE 8

Treatment of Niobium-Titanium Alloy With a Mixture of Calcium and Sodium

A PREP powder of niobium 55-titanium 45 alloy was deoxidized with a sodium sludge containing 23% calcium. Specifically, the 30 g. sample was treated with 2.5 g. sludge at 845° C. for one hour, 950° C. for three hours, and finally 845° C. for an additional hour, all at 2 psig. Oxygen decreased 66% from an initial concentration of 0.056% to a final concentration of 0.019%.

EXAMPLE 9

Treatment of Zirconium with a Mixture of Calcium and Sodium

About 30g of zirconium metal turnings were treated in accordance with the procedure of Example 1. Three grams of sodium sludge containing 30% calcium was heated with the zirconium at 830° C. for one hour then at 930° C. for four hours, all at one psig. Following treatment, the oxygen had decreased to 0.039% from 0.19%, a decrease of about 79%.

EXAMPLE 10

Treatment of 6-4 Titanium Alloy With Calcium

Ten pounds of dry, chopped 6% aluminum 4% vanadium (6-4) titanium alloy turnings with an initial oxygen content of 0.2040% were mixed with 0.55 pounds of calcium shot. These turnings had previously been cleaned by washing with a detergent solution and hot water and vacuum dried. This mixture was placed in a stainless steel retort which was then evacuated and filled with argon gas. This evacuation procedure was repeated three (3) times. The retort was then heated to a temperature of 920° C. and held for a period of six (6) hours. A pressure of approximately 0.5 psig was maintained in the retort during heat treatment. At the end of the heating period the furnace was switched off and the retort was allowed to cool to room temperature. The sintered mass of alloy scrap was removed from the furnace and crushed in a jaw crusher.

The treated scrap turnings were then leached in a plastic lined concrete mixer using one-half percent hydrochloric acid as a leach solution. After leaching, excess acid was drained from the mixer and the turnings were washed with tap water until acid free. The turnings were then dried under vacuum at about 100° C.

The deoxidized turnings had an oxygen content of 0.058% after treatment, a decrease of 71.5% from the original oxygen content.

Example 11

Treatment of 6224 Titanium Alloy With Calcium

Twenty-five pounds of a 6% aluminum, 2% molybdenum, 2% tin, 4% zirconium (6224) titanium alloy chips and one (1) pound of calcium shot were added to a stainless steel retort in layers. The retort was sealed, evacuated with a mechanical vacuum pump and refilled with argon gas. This procedure was repeated three times. The retort was heated to a temperature of 920° C. for a period of seven (7) hours and cooled to room temperature. Both heating and cooling steps were conducted under a 0.5 psig argon pressure. The scrap was removed from the retort and crushed and leached in accordance with the procedure of Example 10.

The oxygen content of these alloy chips was reduced from an initial level of 0.2255% to 0.061%, a decrease of 72%.

EXAMPLE 12

Treatment of 6224 Titanium Alloy With Calcium

Fifty pounds of the 6224 titanium alloy used in Example 11 and one (1) pound of calcium shot were layered in a retort and treated for seven (7) hours under the conditions described in Examples 10 and 11. The retort was cooled to ambient temperature under an argon pressure of 0.5 psig. The product from the retort was crushed and leached in accordance with the procedure of Example 10.

The oxygen content of the resultant titanium alloy was reduced from an initial level of 0.220% to a final oxygen concentration of 0.061%, a decrease of 72%.

EXAMPLE 13

Treatment of Titanium Alpha-2 Aluminum With Calcium

A one and one half by seven inch sample of titanium alpha-2 aluminide (Ti-14Al-21Nb) foil, 0.004 inches thick was loaded into a retort with 0.6 grams of calcium shot. The retort was evacuated, filled with argon gas and heated for 6.5 hours as in the Example 10. After cooling, the foil sample was leached with 0.5% hydrochloric acid and washed with tap water. The oxygen content was reduced from an initial value of 0.44% to a level of 0.21% oxygen, a reduction of 52.3% in the oxygen content.

EXAMPLE 14

Treatment of Titanium With Calcium

A sample of pure titanium foil, three inches long by one quarter inch wide by 0.001 thick, was treated with 5 grams of calcium for 4 hours at 960° C. Processing procedures were the same as those used in Example 13.

After acid cleaning, rinsing and drying, the oxygen level was reduced from 0.241% to 0.093% in the deoxidized foil sample. This is equivalent to a reduction of 61.4% in the oxygen content of the sample.

EXAMPLE 15

Treatment of 6-4 Titanium Alloy With Calcium

A one inch long by one half inch wide by 0.065 inch thick sample of titanium 6% aluminum, 4% vanadium (6-4) alloy was deoxidized for 4 hours at a temperature of 950° C. using 5 grams of calcium. A sample was cut from the deoxidized coupon and analyzed for oxygen. The sample was then treated for an additional 4 hours at a temperature of 960° C. The coupon was again sampled and was subjected to a final four hour treatment. The sample had an initial oxygen content of 0.143%. After the first deoxidation treatment, the oxygen level decreased to 0.085%. After the second deoxidation step the oxygen was reduced to 0.06%. The oxygen dropped to 0.0395% after completion of the total 12 hour treatment. This represents an oxygen decrease of 72%.

EXAMPLE 16

Treatment of Titanium Aloha-2 Aluminide With Calcium

A 3.5 inch by 0.155 inch by 0.020 inch thick sheet sample of titanium alpha-2 aluminide (Ti-14Al-21Nb) was mixed with 3 grams of calcium and deoxidized at 960° C. for 12 hours. After acid cleaning and rinsing, the dry sheet sample which had an initial oxygen content of 0.065% was found to contain 0.015% oxygen. Oxygen removal in this sample amounted to 77 percent.

The above embodiments and examples are provided to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process for the deoxidation of an oxidized refractory metal comprising:
   contacting a refractory metal containing oxygen in minor concentration with a metallic deoxidant in a dry inert atmosphere;
   heating said contacted refractory metal and metallic mixture to at least liquefy said metal mixture and at least partially deoxidize said refractory metal;
   cooling said liquified metallic deoxidant and said deoxidized refractory metal; and
   removing contaminants from the surface of said deoxidized refractory metal.

2. A process in accordance with claim 1 wherein said refractory metal is selected from the group consisting of titanium, zirconium, hafnium, thorium, vanadium, niobium, tantalum, chromium, molybdenum, tungsten, alloys containing one or more of said metals and mixtures thereof.

3. A process in accordance with claim 2 wherein said refractory metal is selected from the group consisting of titanium, zirconium, hafnium, vanadium, niobium, tantalum, alloys containing one or more of said metals and mixtures thereof.

4. A process in accordance with claim 3 wherein said refractory metal is selected from the group consisting of titanium, zirconium, niobium, tantalum, alloys containing one or more of said metals and mixtures thereof.

5. A process in accordance with claim 4 wherein said refractory metal is selected from the group consisting of titanium, zirconium and alloys containing one or both of said metals and mixtures thereof.

6. A process in accordance with claim 5 wherein said refractory metal is titanium or a titanium-containing alloy.

7. A process in accordance with claim 1 wherein said metal deoxidant is calcium.

8. A process in accordance with claim 1 wherein said metal carrier is selected from the group consisting of lithium, potassium, sodium, magnesium and zinc.

9. A process in accordance with claim 8 where said metal is calcium.

10. A process in accordance with claim 9 wherein said metal carrier is sodium.

11. A process in accordance with claim 1 wherein said refractory metal originally contains up to about 1% by weight oxygen, based on the total weight of said refractory metal.

12. A process in accordance with claim 1 wherein said refractory metal and said metal metallic mixture are heated to a temperature in the range of between about 700° C. and about 1200° C. for a period of between about one to twelve hours.

13. A process in accordance with claim 11 wherein said refractory metal and said metal metallic mixture are heated to a temperature in the range of between about 800° C. and about 1,000° C. for a period between about two hours and about ten hours.

14. A process in accordance with claim 12 wherein said heat step is conducted at a pressure in the range of between about substantially full vacuum and about 20 psig.

15. A process in accordance with claim 13 wherein said pressure is in the range of between atmospheric pressure and about 10 psig.

16. A process in accordance with claim 1 wherein said cooling is conducted under an inert gas atmosphere and results in cooling said deoxidized refractory metal and said metallic mixture to approximately ambient temperature.

17. A process in accordance with claim 1 wherein said step of removing contaminants from said surface of said deoxidized refractory metal comprises leaching said metal with a dilute mineral or organic acid.

18. A process in accordance with claim 17 wherein said acid is selected from the group consisting of hydrochloric acid, nitric acid and acetic acid.

19. A process in accordance with claim 18 wherein said acid is 0.5% to 3% muriatic acid.

20. A process in accordance with claim 17 comprising the steps of rinsing said metal acid leached refractory metal with water followed by drying.

21. A process for the deoxidation of titanium comprising:
(a) contacting titanium, selected from the group consisting of neat titanium and a titanium-containing alloy, said titanium containing up to about 1% by weight oxygen, based on the total weight of said titanium, with a metal metallic mixture, said metal mixture comprising a deoxidant metal selected from the group consisting of calcium, barium and strontium and a mixture of a deoxidant metal selected from the group consisting of calcium, barium, and strontium, and a metal and a carrier metal selected from the group consisting of sodium, lithium, potassium, magnesium, and zinc in an inert dry atmosphere;
(b) heating said titanium and said metallic mixture to a temperature in the range of between about 700° C. and about 1200° C. for about 1 to about 12 hours;
(c) cooling said heated titanium and said metallic mixture to ambient temperature; and
(d) removing contaminants from the surface of said cooled titanium.

22. A process in accordance with claim 21 wherein said titanium is in the form of sheet, foil, cuttings, trimmings, chips, chunks and powders.

23. A process in accordance with claim 22 wherein said titanium is provided in step (a) in a thickness of no more than about 0.1875 inch.

24. A process in accordance with claim 23 wherein said titanium contains less than 0.5% by weight oxygen, based on the total weight of said titanium.

25. A process in accordance with claim 21 wherein said deoxidant metal is calcium metal.

26. A process in accordance with claim 25 wherein said calcium metal is in the form of calcium shot, calcium trimmings, calcium chunks, calcium ingot or calcium liquid.

27. A process in accordance with claim 26 wherein said calcium metal is present in a concentration of between about 1% and about 3% by weight, based on the total weight of said refractory metal.

28. A process in accordance with claim 25 wherein said carrier metal is sodium.

29. A process in accordance with claim 28 wherein said calcium is present in said mixture of calcium and sodium metals in a concentration of between about 5% and about 35% calcium metal based on the total weight of said mixture.

30. A process in accordance with claim 29 wherein said calcium metal component of said calcium-sodium mixture is present in a concentration of between about 1% and about 3% by weight based on the total weight of said refractory metal.

31. A process in accordance with claim 21 wherein said titanium and said metallic mixture are contacted in a dry crucible made of a corrosion resistant metal which does not react with said titanium.

32. A process in accordance with claim 31 wherein said crucible is constructed of Hastelloy metal, stainless steel, steel, titanium or titanium alloys.

33. A process in accordance with claim 21 wherein said titanium and said metallic mixture are contacted under an inert gas atmosphere with the proviso that the inert gas is not nitrogen.

34. A process in accordance with claim 33 wherein said inert gas is argon.

35. A process in accordance with claim 21 wherein said titanium and said metallic mixture are heated at a temperature in the range of between about 800° C. and about 1,000° C. for between about 2 hours and about 12 hours at a pressure of between a vacuum and about 20 psig.

36. A process in accordance with claim 35 wherein said titanium and said metallic mixture are heated to a temperature in the range of between about 900° C. and about 1,000° C. at a pressure in the range of between about 0.25 psig and about 2 psig.

37. A process in accordance with claim 21 wherein said cooling step (c) is conducted under an inert gas atmosphere.

38. A process in accordance with claim 21 wherein said contaiminant removal step (d) comprises treating said titanium with a dilute acid whereby impurities are leached from said titanium; rinsing said acid treated titanium with water to remove said acid and said leached impurities; and drying said titanium to remove said rinse water.

39. A process for deoxidation of titanium comprising:
a) contacting titanium, selected from the group consisting of titanium metal and titanium-containing alloys, having a thickness of less than 0.1875 inch, with calcium metal in a dry inert atmosphere retort;
b) heating said retort to a temperature in the range of between about 900° C. and about 1000° C. at a pressure of between about 0.25 psig and about 10 psig;
c) cooling said retort to ambient temperature;
d) leaching said titanium with a dilute acid selected from the group consisting of hydrochloric acid, nitric acid and acetic acid.

40. A process in accordance with claim 29 wherein said titanium has a thickness of not more than 0.125 inch and is precleaned to remove contaminants prior to being contacted with said calcium.

41. A process in accordance with claim 40 wherein said calcium is present in a concentration such that it represents between about 1% and about 3% by weight, based on the weight of said titanium.

42. A process in accordance with claim 41 wherein said calcium is present as calcium shot.

43. A process in accordance with claim 41 wherein said calcium is present as sodium sludge.

44. A process in accordance with claim 39 wherein said heating step (b) and said cooling step (c) are conducted in an argon atmosphere maintained at a pressure of about 0.5 psig.

45. A process in accordance with claim 39 wherein said leaching step comprises treating said cooled titanium with 0.5% to 3% muriatic acid.

46. A process in accordance with claim 45 comprising rinsing said leached titanium with water followed by drying to remove said water.

* * * * *